United States Patent [19]
Doerr

[11] Patent Number: 4,784,257
[45] Date of Patent: Nov. 15, 1988

[54] CONVEYOR SYSTEM INCLUDING A RE-RAILER

[75] Inventor: Richard E. Doerr, Middleburg, Fla.

[73] Assignee: Consolidation Coal Company, Pittsburgh, Pa.

[21] Appl. No.: 125,847

[22] Filed: Nov. 27, 1987

[51] Int. Cl.$^4$ .............................................. B65G 41/02
[52] U.S. Cl. .................................. 198/594; 198/303; 198/861.1
[58] Field of Search ................. 198/303, 594, 861.1, 198/861.2, 301

[56] References Cited
U.S. PATENT DOCUMENTS

| | | | |
|---|---|---|---|
| 2,373,839 | 6/1944 | Madeira | 198/861.2 |
| 2,880,847 | 4/1955 | Kelley | 198/303 |
| 2,890,788 | 6/1959 | Hill | 198/594 |
| 3,422,949 | 1/1969 | Bankauf et al. | 198/301 |
| 3,920,115 | 11/1975 | Craggs | 198/861.2 X |
| 4,339,031 | 6/1982 | Densmore | 198/861.2 |

Primary Examiner—Robert J. Spar
Assistant Examiner—Jim Bidwell
Attorney, Agent, or Firm—Alan N. McCartney

[57] ABSTRACT

A conveyor system including a mobile flexible conveyor train adapted to be supported on a mine floor to transport coal from a mining machine to a fixed conveyor positioned in a mine passageway, the conveyor system having a rail system for supporting the conveyor on the mine roof and including re-railer for coacting with trolleys on the flexible conveyor train to provide a smooth transition of the flexible conveyor train from the rail system to the mine floor and back onto the rail system.

15 Claims, 3 Drawing Sheets

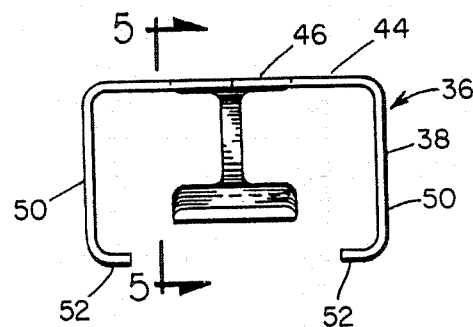
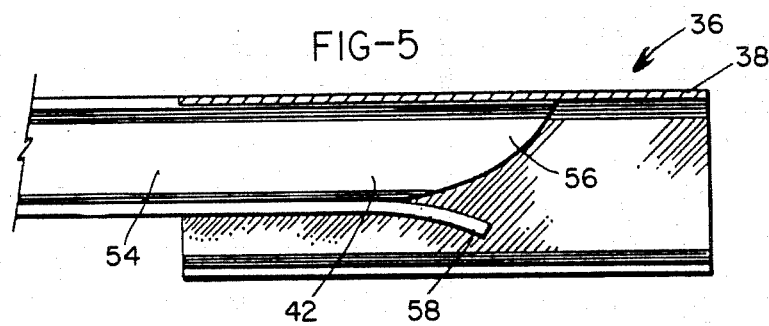
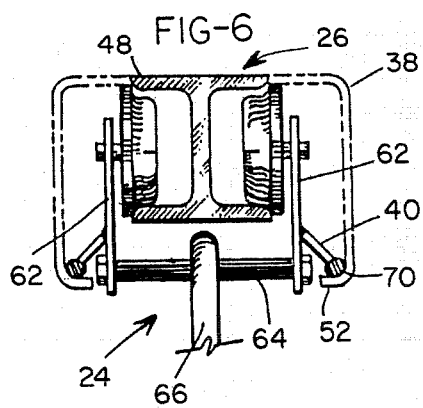
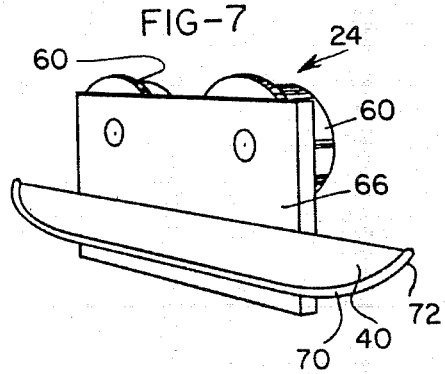
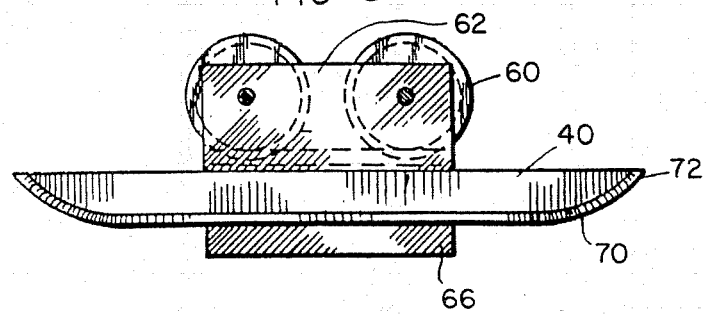

CONVEYOR SYSTEM INCLUDING A RE-RAILER

BACKGROUND OF THE INVENTION

1. Field of the Invention

This invention relates to a conveyor system and a re-railer for the conveyor adapted for use in a mining scheme.

2. Summary of the Invention

A typical mining scheme for mining coal involves a miner which removes coal from a coal face and deposits the coal onto a transporter for conveying the coal out of the mine. In order to transport the coal from the face where it is mined, a mobile flexible conveyor train can be used to transport the coal to a fixed panel conveyor which transports the coal to a convenient location for removal from the mine.

In the typical scheme of using this arrangement of apparatus to mine coal, the panel conveyor belt is positioned in a belt entry extending into the coal passageway. A mine roof mounted rail system carries a flexible conveyor train over the panel belt and is positioned between the panel belt and the miner to transport the coal from the miner to the panel belt.

As the belt entry is mined to about 100 feet, a crosscut passageway is mined at an angle to the belt entry. The crosscut is then mined in a straight run, making breakthroughs into the previously mined track, intake and return entry passageways. As the crosscut is being mined in this fashion, the rail system is temporarily hung from the mine roof in the crosscut. After completion of the crosscut, the return entry, intake entry and track entry are mined in a direction parallel to the belt entry. Thereafter, the flexible conveyor train is withdrawn into the belt entry and the rail system in the crosscut is removed. Thereafter, the sequence is repeated with the belt entry being extended, another crosscut mined and the rail system temporarily installed into the mine roof in the crosscut.

To alleviate the problem of temporarily hanging the rail system in each crosscut, it is desirable to provide a flexible conveyor train which can be self-supporting on the mine floor and removed from the rail system when making the crosscut and be realigned with the rail system when withdrawn from the crosscut during this type of mining sequences.

SUMMARY OF THE INVENTION

It is the purpose of this invention to provide a mining conveyor system and a re-railer for the flexible conveyor train of the system.

It is an object of this invention to provide a flexible train conveyor having means to support the conveyor on a mine floor during entry into a passageway and a trolley to be carried on a rail system mounted to the mine roof, the rail system having a re-railer which will align the trolley to the rail system upon withdrawal of the conveyor from a mine passageway. The re-railer coacts with the trolley to provide a smooth transition of the trolley to and from the rail system.

It is a further object of this invention to provide a mobile flexible conveyor system for removing mined coal from a passageway and transporting the coal to a fixed conveyor, the flexible conveyor being self-supporting on the mine floor at the input end and supported on a rail system above the fixed conveyor at the outboard end. The rail system includes a re-railer chute at the end thereof to assist in aligning a trolley on the flexible conveyor to the support rails during entry and exit of the trolley from the rails.

BRIEF DESCRIPTION OF THE DRAWINGS

FIG. 4 is an end view of the re-railer;

FIG. 5 is a sectional view taken long the line 5—5 of FIG. 4;

FIG. 6 is an end view of the conveyor trolley in position on the support rail;

FIG. 7 is a perspective view of the trolley; and

FIG. 8 is a side view of the trolley.

DESCRIPTION OF THE PREFERRED EMBODIMENTS

Figure 3:
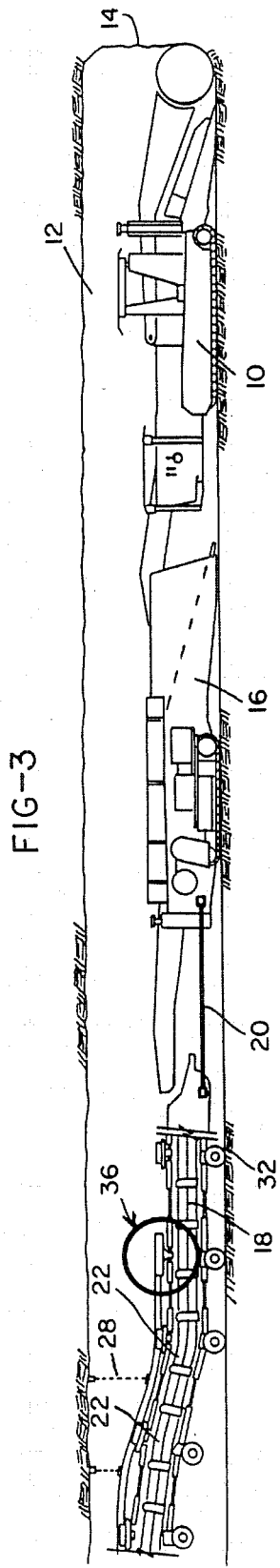
FIG. 3 is an illustration of the overall mining apparatus.

Attention is directed to FIG. 3 which illustrates a typical coal mining scheme where a self-propelled continuous miner 10 positioned in a passageway 12 removes coal from the face 14 and deposits the coal on a self-propelled loader 16.

In this mining scheme illustrated, a flexible conveyor train 18 can be positioned behind the loader 16 and may be self-propelled or carried along by being pulled by the loader as diagramatically illustrated at 20 in FIG. 3.

The flexible conveyor train 18 comprises a plurality of individual units 22 articulated together in some convenient manner (not shown) so that the conveyor train 18 can be turned in angularly disposed passageways during the mining operation. An example of such a conveyor train is illustrated in U.S. Pat. No. 4,339,031. Each of the units 22 have a trolley 24 adapted to be carried on a rail 26 suspended from the mine roof by any convenient means such as chains 28 (See FIG. 2) anchored in the mine roof.

With the mining apparatus thus far described, a typical mining scheme is to mine the belt entry (See FIG. 1) to the desired distance, install a fixed panel conveyor 30 and mount the overhead rail 26 over the fixed conveyor 30 for carrying the flexible conveyor train 18. Thereafter, a crosscut passageway is mined at right angles to the belt entry. As the crosscut is mined, the rail 26 is temporarily mounted to mine roof to support the conveyor train 18. Upon completion of the crosscut, the return entry is mined and then the intake and track entries. During this process, the mined coal is carried by the conveyor train 18 and deposited on conveyor 30. Thereafter, the flexible conveyor train 18 is withdrawn into the belt entry and the rail 26 mounted in the crosscut is removed. The conveyor train can be self-propelled for removal from the passageway. The belt entry is then mined up and the process repeated. In each sequence of this mining scheme, it is necessary to temporarily place the rail 26 in the crosscut and remove the rail after mining each crosscut section.

Figure 1:
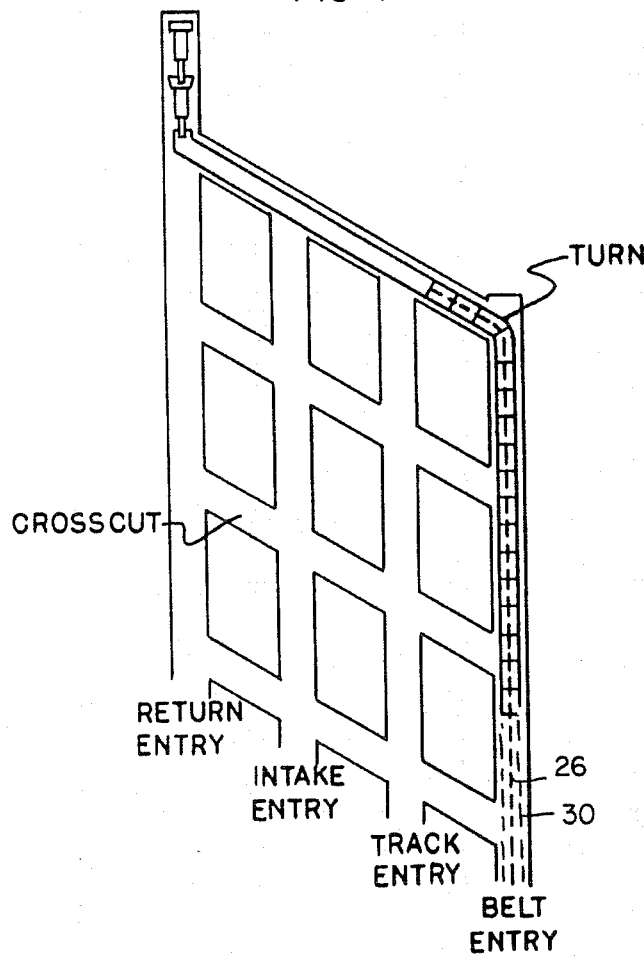
FIG. 1 is a diagramatic illustration of a mining scheme.
Figure 2:
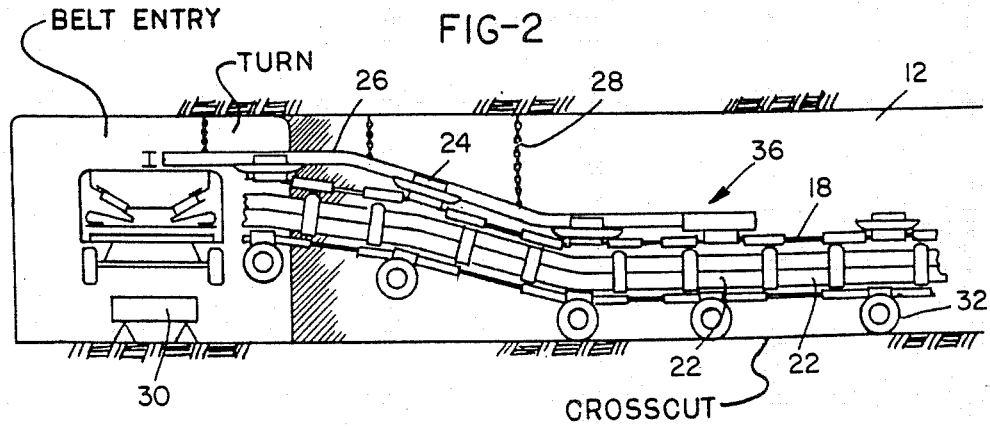
FIG. 2 is an illustration of a flexible conveyor train.

In the mining scheme contemplated by this invention, the individual units 22 of the conveyor train 18 are provided with wheels 32 and the overhead rail 26 only extends into the turn in the crosscut passageway (See FIGS. 1 and 2). Thus, as the conveyor train 18 is extended into the crosscut, the trolley 24 of each unit 22 falls off the rail 26 and the units 22 are supported on the mine floor on their wheels 32.

With this arrangement, the crosscut and return entry and intake and track entries can be mined in the same sequence as previously described without the necessity of installing the temporary rail 26 for suspending the conveyor train the entire length of each crosscut. It should be noted that other conveyor trains are also contemplated to be within this invention, such as tramming conveyors.

As the conveyor train is supported on the mine floor and is advanced into and removed from the crosscut during each mining sequence, the individual conveyor units 22 will become misaligned so that the separate trolleys 24 will be slightly misaligned with the rail 26. To compensate for this misalignment and permit the aforementioned mining scheme to be practiced, the end portion 34 of the rail 26 is provided with a re-railer 36.

Attention is now directed to FIGS. 4 through 8 which illustrate the details of the re-railer 36. The re-railer 36 comprises a chute 38 which coacts with the trolley 24 to horizontally and vertically align the trolley 24 with the rail 26 when the flexible conveyor train 18 is withdrawn from a mine passageway. The trolleys 24 each have guide members 40 which in combination with the chute 38 and an extension 42 on the rail 26 provide a smooth transition of the trolley from the rail when the flexible conveyor train is drawn into a mine passageway.

The chute 38 comprises a substantially rectangular housing 44 having an upper longitudinally extending surface 46 welded or otherwise secured to the upper flange 48 of the rail 26. The surface 46 of chute 38 has longitudinally extending side portions 50 which are formed into inwardly extending flanges 52. The rib 54 of rail 26 has an upwardly inclined portion 56 and the lower flange 58 of the rail 26 is curved downwardly (See FIG. 5) for a smooth transition of the trolley wheels 60 onto and from the rail.

The trolleys 24 each comprise a set of wheels 60 carried on plates 62. The plates 62 are connected by a rod 64 mounted in a block 66 which is carried on unit 22. Welded to the sides of plates 62 are dish-shaped guides 40 which have a rim 70 with curved ends 72 which ride into the flanges 52 to align the trolley wheels 60 with the rail 26 for a smooth transition of the trolley onto and off from the rail (See FIG. 6).

In operation, trolleys 24 engage the re-railer 36 by entering the chute 38 with the tapered or rounded guide ends 72 engaging the lower flange 52 and substantially align the central axis of trolley 24 with that of rail 26. It should be noted that in order for this alignment to occur, trolley 24 must be flexibly mounted to conveyor unit 22 with limited motion. Flexibility must be sufficient to allow trolley 24 to align with rail 26, but not so great as to allow trolley 24 to be sufficiently misaligned so that both ends 72 of guide 70 do not enter chute 38 of re-railer 36.

It can thus be seen with the use of the mine floor supported flexible conveyor train and the novel re-railer, a new and different mining scheme can be accomplished, eliminating the necessity for installing over head rails down the entire crosscut. With the conveyor system of this invention, it is only necessary to remove and reinstall a short length of the overhead rail in the area of the turn from the belt entry into the crosscut.

I claim:

1. A conveyor system for transporting mined coal from a coal mining machine traveling over a floor of a coal mine, said conveyor system comprising:

a first generally straight, relatively fixed haulage conveyor occupying a first position in said coal mine;

a second mobile, articulated conveyor extending between the mining machine and said first conveyor;

a rail support overlying a substantial portion of said first conveyor;

means attached to said second conveyor for suspending said second conveyor from said rail support;

means for supporting said second conveyor on the floor of said coal mine;

a curved transition section mounted adjacent one end of said rail support and including re-railer means to enable said suspending means to be smoothly transferred to and from said rail support.

2. The conveyor system of claim 1 wherein the first position of said haulage conveyor comprises a first longitudinal tunnel.

3. The conveyor system of claim 2 wherein said haulage conveyor is mounted upon the floor of said first longitudinal tunnel.

4. The conveyor system of claim 2 wherein said curved transition section extends from said first longitudinal tunnel into a first lateral tunnel.

5. The conveyor system of claim 4 wherein said curved transition section is temporarily suspended from the roof of said first longitudinal tunnel and the roof of said first lateral tunnel to permit shifting of said curved transition section to an alternate position extending from said first longitudinal tunnel into a second lateral tunnel.

6. The conveyor system of claim 1 wherein said means for suspending said second conveyor from said rail support comprises a series of trolleys.

7. The conveyor system of claim 1 wherein the means for supporting said second conveyor on the floor of said mine comprises a series of wheels.

8. The conveyor system of claim 6 wherein said re-railer means comprises means coacting between said trolley and said rail support permitting said trolleys to be aligned with said rail support and guided onto and off from said rail support.

9. The conveyor system of claim 8 wherein said re-railer comprises a chute on said rail support, said chute having downwardly and inwardly extending flanges with said trolleys having guides coacting with said flanges to align said trolleys with said rail support.

10. The conveyor system of claim 8 wherein said rail support includes a rib and lower flange configured to assist entry and removal of said trolleys from said rail support.

11. In a conveyor system for transporting mined coal from a mobile mining machine traversing a mine floor to a fixed conveyor, said conveyor system including an articulated mobile conveyor that moves with said mining machine and is supported upon a mine roof-mounted rail system, the improvement comprising:

means attached to said articulated mobile conveyor for supporting said conveyor upon the floor of said mine;

a curved transition section that can be temporarily mounted adjacent one end of said roof-mounted rail system, said curved transition section including a re-railer which ensures the smooth transfer of the articulated mobile conveyor to and from said rail system.

12. The conveyor system of claim 11 wherein said mobile conveyor is pulled in a first direction toward the coal to be mined by said mining machine.

13. The conveyor system of claim 11 including trolleys on said mobile conveyor adapted to be supported on said rail system and removed therefrom, said rail system including means assisting in the transfer of said trolleys to and from said rail system.

14. The conveyor system of claims 13 wherein said trolleys including means assisting in the transfer of said trolleys to and form said rail system.

15. The conveyor system of claim 14 wherein said rail system includes flanges with which guides on said trolleys coact to assist in the alignment of said trolleys with said rail system.

* * * * *